3,024,231
RACEMIZATION OF D- AND L-ISOMERS OF ALPHA-AMINO-EPSILON-CAPROLACTAM
Joseph H. Scherrer, Kansas City, Kans., assignor to Spencer Chemical Company, Kansas City, Mo., a corporation of Missouri
No Drawing. Filed Feb. 11, 1959, Ser. No. 792,480
4 Claims. (Cl. 260—239.3)

This invention relates to lysine. More particularly, it is concerned with the preparation of intermediates useful in the production of optically active lysine.

In copending application Serial No. 574,967, filed March 30, 1956, now United States Patent No. 2,876,218, issued March 3, 1959, it is disclosed that alpha-amino-epsilon-caprolactam can be converted by hydrolysis to racemic lysine. Furthermore, it is shown in patent application Serial No. 789,480, filed January 28, 1959, that DL-alpha-amino-epsilon-caprolactam can be resolved by forming the dibenzoyl-(+)-tartaric acid salt thereof and fractionally crystallizing L-alpha-amino-epsilon-caprolactam dibenzoyl-(+)-tartrate from water. The filtrate contains D-alpha-amino-epsilon-caprolactam dibenzoyl-(+)-tartrate. Both the D and L-alpha-amino-epsilon-caprolactams can be isolated from the tartrates by treatment with ion exchange resins, acids or bases. The separated L-alpha-amino-epsilon-caprolactam can then be hydrolyzed to L-lysine free, or essentially free, of the biologically inactive D-lysine.

The D-alpha-amino-epsilon-caprolactam upon hydrolysis gives D-lysine which is not biologically active so that this is not generally done although it may be done since the prior art teaches the racemization of D-lysine into DL-lysine and the resolution thereof into D and L-lysine.

According to the present invention it has been discovered that D-alpha-amino-epsilon-caprolactam can be converted to racemic or DL-alpha-amino-epsilon-caprolactam. The DL-alpha-amino-epsilon-caprolactam can then be resolved as indicated above to separate the D and L-alpha-amino-epsilon-caprolactam isomers and produce L-lysine.

The conversion of D-alpha-amino-epsilon-caprolactam to racemic alpha-amino-epsilon-caprolactam can be readily effected by heating the D-isomer, or a salt thereof, in a liquid medium.

The liquid medium used for the racemization process can be any suitable liquid which does not react adversely with D-alpha-amino-epsilon-caprolactam and which is stable under the reaction conditions employed. Furthermore, the liquid medium need not dissolve the D-alpha-amino-epsilon-caprolactam since the racemization is also achieved with the amino lactam, or a salt thereof, suspended in the medium.

Some of the liquid mediums that are useful in the process are water and organic liquids such as xylene, ethylene glycol and ethanol.

Although the racemization can be effected at lower temperatures, it is advisable to effect the racemization at a temperature from about 70° to 175° C. Lower temperatures result in slower rates of racemization while higher temperatures generally give no advantage over those below about 175° C. By selecting a proper liquid medium the racemization can be readily effected at the reflux temperature so that temperature control may be achieved with ease.

The time of heating is not narrowly critical although at the lower temperatures about 1 hour is often required to effect a significant racemization. As the racemization temperature increases the time needed for the racemization decreases, although perhaps not in a direct proportion. Broadly, from 30 minutes to 5 hours will suffice for the racemization although it should be understood that the time required is dependent to some extent upon the reaction temperature.

As indicated above, the free base of the D-alpha-amino-epsilon-caprolactam may be used in the process, or a salt thereof, such as the hydrochloride, sulfate, phosphate, or the like.

Following the racemization the product may be recovered by conventional methods such as by evaporating or distilling off the solvent, by adding a solvent such as ethanol to precipitate the product when it is in the form of a salt such as the hydrochloride, or by simply cooling to precipitate the product when in the free base form in solvents such as xylene. The product obtained may be partially or completely racemized depending on the reaction conditions. However, the mixture may be treated in the resolution process as described previously and the D and L isomers separated. The D isomer may then be racemized as described.

Although the invention is of primary concern with racemization of D-alpha-amino-epsilon-caprolactam, it is also suitable for racemization of the L-isomer in the same way. Furthermore, optically active mixtures of the D and L isomers may be treated as described to be made more, if not totally, racemic.

In a further embodiment of the invention it has been found that the inclusion of activated carbon or charcoal in the lactam-liquid medium aids greatly in bringing about the racemization. The amount of activated carbon added may vary although an amount by weight about equal to the amino lactam to be racemized is particularly effective. The activated carbon is used advisably as a pulverulent or powdered material.

The following examples are presented to illustrate the invention.

EXAMPLE 1

Four grams of D-alpha-amino-epsilon-caprolactam was treated with activated carbon in refluxing xylene and recrystallized from the solvent to yield 3.7 g. (93% recovery) of DL-alpha-amino-epsilon-caprolactam, M.P. 74°–76° C., $[\alpha]_D^{26}$ 0.00°.

EXAMPLE 2

Four grams of D-alpha-amino-epsilon-caprolactam was treated with activated carbon in refluxing xylene. Two grams of partially racemized product $[\alpha]_D^{26}$ +3.26° was obtained. It was dissolved in 100 ml. of xylene and refluxed for 6 hours. Upon concentrating and cooling the solution there was obtained 1.4 g. of DL-alpha-amino-epsilon-caprolactam.

EXAMPLE 3

Four grams of crude D-alpha-amino-epsilon-caprolactam and four grams of activated charcoal were added to 150 ml. of hot xylene (90° C.) with stirring. The solution was maintained at 90° C. for one hour and then filtered. The filtrate was cooled to precipitate the amino lactam, which was isolated by filtration and dried to give 3.7 g. (93% recovery) melting at 69–71° C. A portion of this material (1.7 g.) was converted to the hydrochloride by acidifying an ethanol solution of the free base with an ethanolic solution of hydrogen chloride to give a 96% yield melting at 301–302° C. (dec.), $[\alpha]_D^{25}$ 0.0°±.1° (C.=10.0 in water).

EXAMPLE 4

Seventy-five ml. of xylene was heated to 90° C. While stirring at this temperature there was added 2 g. of activated charcoal and 2 g. of L-alpha-amino-epsilon-caprolactam, $[\alpha]_D^{26}$ −14.2°. The mixture was stirred for 1 hour at 90° C. and filtered while hot. The filtrate was cooled to about 5° C. and filtered to isolate the lactam. This material was dissolved in about 10 ml. of absolute ethanol and acidified with anhydrous hydrogen chloride. The mixture was cooled and filtered to yield 2.1 g. (98% recovery) of DL-alpha-amino-epsilon-caprolactam hydrochloride, M.P. 289–291° C., $[\alpha]_D^{26}$ 0.00°.

The procedure was repeated except that heating was at 90° C. for 5 hours and 1.2 g. of DL-alpha-amino-epsilon-caprolactam hydrochloride was recovered, M.P. 287°–289° C., $[\alpha]_D^{26}$ 0.00°.

EXAMPLE 5

A solution of 2 g. of L-alpha-amino-epsilon-caprolactam hydrochloride $[\alpha]_D^{25}$ −15.79° (C.=5.0 in water), in 75 ml. of ethylene glycol was heated at 150° C. for 5 hours. The bulk of the solvent was removed under reduced pressure and absolute ethanol added to the residue to precipitate 1.4 g. of partially racemized alpha-amino-epsilon-caprolactam, M.P. 297°–299° C., $[\alpha]_D^{25}$ −3.94°.

When the above procedure was repeated by heating the ethylene glycol solution at 70° C. for 14 hours followed by heating at 100° C. for 8.5 hours, there was recovered 1.6 g. (80%) of partially racemized alpha-amino-epsilon-caprolactam hydrochloride, M.P. 296°–298° C., $[\alpha]_D^{25}$ −5.05 (C.=5.0 in water).

EXAMPLE 6

In a 100 ml. 3-necked flask fitted with a mechanical stirrer, thermometer and reflux condenser was placed 75 ml. of solvent. After heating to the appropriate temperature, 2.0 g. of L-alpha-amino-epsilon-caprolactam and 2.0 g. of activated charcoal was added and the mixture heated for the indicated time. The solution was filtered, and the filtrate was cooled to precipitate the DL-alpha-amino-epsilon-caprolactam. The dried product was converted to the hydrochloride by acidifying the base in absolute ethanol. Optical rotation of the amino lactam hydrochloride was measured as a 10% solution in water. The results are shown in the following table.

Table

RACEMIZATION OF L-ALPHA-AMINO-EPSILON-CAPROLACTUM ($[\alpha]_D^{26}$ −14.2°)

| Temp. (°C.) | Time | Recovery (Percent) [a] | Solvent | $[\alpha]_D^{26}$ [b] (C.=10% in water) |
|---|---|---|---|---|
| 135 | 5 hrs | [c] 37 | Xylene | 0.0° |
| 135 | 40 min. | 70 | do | −5.2°±.1 |
| 135 | 29 min. | 85 | do | −6.7°±.1 |
| 110 | 40 min. | 90 | do | −8.5°±.1 |
| 110 | 40 min. | 90 | do | −12.9°±.1 [d] |
| 90 | 5 hrs. | [e] 47 | do | 0.0° |
| 90 | 1 hr. | 98 | do | 0.0° |
| 100 | 4 hrs. | [e] 94 | Water | −7.4°±.1 |

[a] The percent recovery is based on the free base.
[b] All optical rotations were measured on the hydrochloride salt. The specific rotation for the starting material was −14.2°±0.1.
[c] After filtering the charcoal, the filtrate was evaporated to dryness leaving an oil which was taken up in alcohol and acidified with anhydrous hydrogen chloride. In these cases, the percent recovery was based on the hydrochloride salt.
[d] No charcoal was used in this run.
[e] The recovered amino lactam was not dry so the percent recovery is based on the isolated hydrochloride.

Various changes and modifications of the invention can be made and, to the extent that such variations incorporate the spirit of this invention, they are intended to be included within the scope of the appended claims.

What is claimed is:
1. The process which comprises heating an optically active isomer of alpha-amino-epsilon-caprolactam in an inert liquid medium containing activated carbon at a temperature of about 70° to 175° C. to at least partially racemize the said lactam.
2. The process of claim 1 in which the isomer is the D isomer.
3. The process which comprises heating D-alpha-amino-epsilon-caprolactam in an inert liquid medium containing activated carbon at a temperature of about 70° to 175° C. for about 0.5 to 5 hours to produce substantially racemic alpha-amino-epsilon-caprolactam.
4. The process which comprises heating an optically active isomer of alpha-amino-epsilon-caprolactam in xylene containing activated carbon at a temperature of about 70° to 175° C. to at least partially racemize the said lactam.

References Cited in the file of this patent

Gilman: "Organic Chemistry," pages 176–87 (1938) (Wiley).
Adamson: J. Chem. Soc. (London), 1943, pp. 39–40.
Kibrick: J. Biol. Chem., vol. 174, pages 845–9 (1948).
Theilheimer: Synthetic Methods in Org. Chem., vol. 9, p. 231 (1955).
Fieser et al.: "Organic Chemistry," page 256, pages 474–6, 3rd ed. (1957) (Reinhold).
Noller: Chemistry of Organic Compounds, pp. 345–6, 2nd edition (1958).
Noller: "Chemistry of Organic Compounds," page 784, 2nd ed. (1958) (Saunders).

UNITED STATES PATENT OFFICE
CERTIFICATE OF CORRECTION

Patent No. 3,024,231                                March 6, 1962

Joseph H. Scherrer

It is hereby certified that error appears in the above numbered patent requiring correction and that the said Letters Patent should read as corrected below.

Column 4, lines 2 and 3, in the title of the table, for "CAPROLACTUM" read -- CAPROLACTAM --; same table, under the heading "Time" for "29 min." read -- 20 min. --.

Signed and sealed this 19th day of June 1962.

(SEAL)
Attest:

ERNEST W. SWIDER
Attesting Officer

DAVID L. LADD
Commissioner of Patents